(12) United States Patent
Yoon et al.

(10) Patent No.: US 7,943,252 B2
(45) Date of Patent: May 17, 2011

(54) BATTERY MODULE OF IMPROVED SAFETY AND MIDDLE OR LARGE-SIZED BATTERY PACK CONTAINING THE SAME

(75) Inventors: Hee Soo Yoon, Daejeon (KR); Dal Mo Kang, Daejeon (KR); HanHo Lee, Daejeon (KR); Jeeho Kim, Daejeon (KR); Jongmoon Yoon, Daejeon (KR); Hey Woong Park, Daejeon (KR); Hojin Jeon, Seoul (KR); Jin Kyu Lee, Busan (KR); Sung Joon Park, Seoul (KR); Daesik Choi, Yongin-Si (KR); Bumhyun Lee, Seoul (KR)

(73) Assignee: LG Chem, Ltd., Seoul (KR)

(*) Notice: Subject to any disclaimer, the term of this patent is extended or adjusted under 35 U.S.C. 154(b) by 0 days.

(21) Appl. No.: 12/673,018

(22) PCT Filed: Oct. 30, 2008

(86) PCT No.: PCT/KR2008/006390
§ 371 (c)(1),
(2), (4) Date: Aug. 11, 2010

(87) PCT Pub. No.: WO2009/066880
PCT Pub. Date: May 28, 2009

(65) Prior Publication Data
US 2010/0297482 A1    Nov. 25, 2010

(30) Foreign Application Priority Data
Nov. 21, 2007 (KR) .......................... 10-2007-0119071

(51) Int. Cl.
*H01M 2/00*    (2006.01)
*H01M 2/10*    (2006.01)

(52) U.S. Cl. ........................................ 429/99; 429/100
(58) Field of Classification Search .................. 429/61, 429/99, 100, 153; 320/116, 124, 134, 135
See application file for complete search history.

(56) References Cited

U.S. PATENT DOCUMENTS

| | | |
|---|---|---|
| 2007/0122691 A1 | 5/2007 | Lee et al. |
| 2008/0102364 A1 | 5/2008 | Uh et al. |

FOREIGN PATENT DOCUMENTS

| | | |
|---|---|---|
| KR | 10-2001-0008860 A | 2/2001 |
| KR | 10-2001-0038812 A | 5/2001 |
| KR | 10-2004-0045937 A | 6/2004 |
| KR | 10-2006-0114549 A | 11/2006 |
| KR | 10-2007-0056494 A | 6/2007 |
| KR | 10-0768186 B1 | 10/2007 |
| KR | 10-2008-0037199 A | 4/2008 |

*Primary Examiner* — Gregg Cantelmo
(74) *Attorney, Agent, or Firm* — Birch, Stewart, Kolasch & Birch, LLP

(57) ABSTRACT

Disclosed herein is a high-power, large-capacity battery module including a plurality of battery cells or unit modules connected in series to each other such that the battery cells or the unit modules are stacked while being in tight contact with each other or being adjacent to each other, wherein the battery module is fixed such that the stacked state of the battery cells or the unit modules is maintained even when the volume of the battery cells or the unit modules changes at the time of charging and discharging the battery cells or the unit modules, and a portion of an electrode terminal connection region between the battery cells or between the unit modules is weak with respect to the volume expansion of the battery cells or the unit modules such that an expansion stress caused by the swelling of the battery cells is concentrated on the electrode terminal connection region, whereby the electrode terminal connection region is broken, and therefore, an electrical cut-off occurs at the electrode terminal connection region, when the swelling exceeds a predetermined value.

9 Claims, 8 Drawing Sheets

BATTERY MODULE OF IMPROVED SAFETY AND MIDDLE OR LARGE-SIZED BATTERY PACK CONTAINING THE SAME

FIELD OF THE INVENTION

The present invention relates to a battery module of improved safety, and, more particularly, to a high-power, large-capacity battery module including a plurality of battery cells or unit modules connected in series to each other such that the battery cells or the unit modules are stacked while being in tight contact with each other or being adjacent to each other, wherein the battery module is fixed such that the stacked state of the battery cells or the unit modules is maintained even when the volume of the battery cells or the unit modules changes at the time of charging and discharging the battery cells or the unit modules, and a portion of an electrode terminal connection region between the battery cells or between the unit modules is weak with respect to the volume expansion of the battery cells or the unit modules such that an expansion stress caused by the swelling of the battery cells is concentrated on the electrode terminal connection region, whereby the electrode terminal connection region is broken, and therefore, an electrical cut-off occurs at the electrode terminal connection region, when the swelling exceeds a predetermined value.

BACKGROUND OF THE INVENTION

As mobile devices have been increasingly developed, and the demand of such mobile devices has increased, the demand of secondary batteries has also sharply increased as an energy source for the mobile devices. Among them is a lithium secondary battery having high energy density and high discharge voltage, on which much research has been carried out and which is now commercially and widely used.

A secondary battery has attracted considerable attention as an energy source for power-driven devices, such as electric bicycles (E-bikes), electric vehicles (EVs), or hybrid electric vehicles (HEVs), as well as an energy source for mobile wireless electronic devices, such as mobile phones, digital cameras, personal digital assistants (PDAs), and laptop computers.

A small-sized battery pack having a battery cell packed therein is used for small-sized devices, such as mobile phones and digital cameras. On the other hand, a middle- or large-sized battery pack having a battery pack, which includes two or more battery cells (hereinafter, occasionally referred to as a "multi-cell") connected in parallel and/or in series to each other, packed therein is used for middle- or large-sized devices, such as laptop computers and electric vehicles.

As previously described, a lithium secondary battery exhibits excellent electrical properties; however, the lithium secondary battery has low safety. For example, when abnormal operations, such as overcharge, overdischarge, exposure to high temperature, and electrical short circuits, of the lithium secondary battery occur, decomposition of active materials and an electrolyte, which are components of the battery, is caused, with the result that heat and gas are generated, and the high-temperature and high-pressure condition caused by the generation of the heat and the gas accelerates the above-mentioned decomposition. Eventually, a fire or explosion may occur.

For this reason, the lithium secondary battery is provided with a safety system, such as a protection circuit for interrupting electric current during overcharge, overdischarge, or overcurrent of the battery, a positive temperature coefficient (PTC) element whose resistance greatly increases so as to interrupt electric current when the temperature of the battery increases, and a safety vent for interrupting electric current or discharging gas when pressure increases due to the generation of the gas. In the case of a small-sized cylindrical secondary battery, for example, the PTC element and the safety vent are usually disposed at the top of an electrode assembly (a generating element) having a cathode/separator/anode structure, which is mounted in a cylindrical case. In the case of a prismatic or pouch-shaped small-sized secondary battery, on the other hand, the protection circuit module and the PTC element are usually mounted at the upper end of a prismatic case or a pouch-shaped case, in which the generating element is mounted in a sealed state.

The safety-related problem of the lithium secondary battery is even more serious for a middle- or large-sized battery pack having a multi-cell structure. Since a plurality of battery cells are used in the multi-cell structure battery pack, the abnormal operation of some of the battery cells may cause the abnormal operation of the other battery cells, with the result that a fire or explosion may occur, which may lead to a large-scale accident. For this reason, the middle- or large-sized battery pack is provided with a safety system, such as a fuse, a bimetal, and a battery management system (BMS), for protecting the battery cells from the overcharge, the overdischarge, and the overcurrent.

However, as the lithium secondary battery is continuously used, i.e., as the lithium secondary battery is continuously charged and discharged, the generating element and the electrically connecting members are gradually degraded. For example, the degradation of the generating element leads to the decomposition of the electrode material and the electrolyte, by which gas is generated. As a result, the battery cell (the cylindrical, prismatic, or pouch-shaped case) gradually swells. In the normal state of the lithium secondary battery, the safety system, i.e., the BMS detects the overdischarge, the overcharge, and the overcurrent, and controls/protects the battery pack. In the abnormal state of the lithium secondary battery, however, when the BMS does not operate, a possibility of danger increases, and it is difficult to control the battery pack for securing the safety of the battery pack. The middle- or large-sized battery pack is generally constructed in a structure in which a plurality of battery cells is fixedly mounted in a predetermined case. As a result, the respective swelling battery cells are further pressurized in the restrictive case, and therefore, a possibility of a fire or explosion greatly increases under the abnormal operation condition of the battery pack.

In connection with this case, FIG. 1 is a circuit diagram typically illustrating a conventional middle- or large-sized battery pack. Referring to FIG. 1, the conventional middle- or large-sized battery pack 900 includes a battery module assembly 500 constituted by a plurality of battery cells, a BMS 600 for detecting and controlling the operation of the battery module assembly 500, and a power switch unit (relay) 700 for connecting the battery module assembly 500 and an external input and output circuit (inverter) 800 to each other or disconnecting the battery module assembly 500 and the external input and output circuit 800 from each other according to an operation command from the BMS 600.

The BMS 600 maintains the power switch unit 700 to be on in a normal operation condition of the battery module assembly 500. When the abnormality of the battery module assembly 500 is detected, the BMS 600 switches the power switch unit 700 to become off such that the charging and discharging operation of the battery module assembly 500 is interrupted. On the other hand, when the BMS abnormally operates or does not operate, no control is carried out by the BMS 600, and therefore, the power switch unit 700 is maintained on. As a result, the charging and discharging operation of the battery module assembly 500 is continuously carried out even in a normal operation condition of the battery module assembly 500.

Therefore, there is a high necessity for a technology that is capable of fundamentally securing the safety of the middle- or large-sized battery pack while solving the above problems.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have found that, in case of a battery module being constructed in a structure in which a portion of an electrode terminal connection region between battery cells is weak with respect to the volume expansion of the battery cells due to the swelling of the battery cells, an expansion stress caused by the swelling of the battery cells is concentrated on the weak region, when the battery cells swell due to an abnormal operation, such as overcharge, overdischarge, or overcurrent, of the battery module or due to the deterioration of the battery cells caused by the charge and discharge of the battery cells for a long time, with the result that the electrode terminal connection region is broken, and therefore, an electrical cut-off occurs at the electrode terminal connection region, thereby securing the safety of the battery module to a desired level.

Therefore, it is an object of the present invention to provide a battery module of a specific structure to improve safety and a middle- or large-sized battery pack including the same.

In accordance with one aspect of the present invention, the above and other objects can be accomplished by the provision of a high-power, large-capacity battery module including a plurality of battery cells or unit modules connected in series to each other such that the battery cells or the unit modules are stacked while being in tight contact with each other or being adjacent to each other, wherein the battery module is fixed such that the stacked state of the battery cells or the unit modules is maintained even when the volume of the battery cells or the unit modules changes at the time of charging and discharging the battery cells or the unit modules, and a portion of an electrode terminal connection region between the battery cells or between the unit modules is weak with respect to the volume expansion of the battery cells or the unit modules such that an expansion stress caused by the swelling of the battery cells is concentrated on the electrode terminal connection region, whereby the electrode terminal connection region is broken, and therefore, an electrical cut-off occurs at the electrode terminal connection region, when the swelling exceeds a predetermined value.

In the battery module, constructed in a structure in which the battery cells or the unit modules are stacked, the battery cells are expanded by the swelling of the battery cells due to an abnormal operation, such as overcharge, overdischarge, or overcurrent, of the battery module or due to the deterioration of the battery cells caused by the charge and discharge of the battery cells for a long time, as previously described, and the expansion of the battery cells causes the combustion and explosion of the battery module.

For this reason, the battery module according to the present invention is constructed in a structure in which the electrode terminal connection region between the battery cells or between the unit modules is weak with respect to the volume expansion of the battery cells when the battery cells swell. Consequently, when the swelling exceeds the predetermined value, e.g., a limit value, the expansion stress is concentrated on the electrode terminal connection region, whereby the electrode terminal connection region is physically deformed, e.g., broken. By the breakage of the electrode terminal connection region, the electrical connection in the battery module is interrupted, and therefore, the charging and discharging operation is stopped, with the result that further swelling of the battery cells or the unit modules is restrained. Consequently, the combustion or explosion of the battery module is prevented, whereby the safety of the battery module is greatly improved.

In an exemplary embodiment, the battery cells or the unit modules, constituting the battery module according to the present invention, are covered by a case, and a partial opening or a notch is formed at a predetermined region of the case corresponding to the electrode terminal connection region, which is broken when the swelling of the battery cells is excessive. That is, a portion of the case corresponding to the electrode terminal connection region is formed in the shape of an opening or a notch which is weak with respect to the expansion stress such that the excessive expansion stress of the battery cells caused by the swelling of the battery cells is concentrated on the opening region or the notch region corresponding to the electrode terminal connection region.

The case may be a high-strength case or a sealing member. As an example of the latter, a plurality of battery cells or unit modules are mounted in a predetermined frame member, and a sealing member is mounted to the outside of the frame member. When the sealing member is made of a heat insulating material, it is possible to restrain the occurrence of the temperature difference between the battery cells or the unit modules due to the exposure of some of the battery cells or the unit modules to the outside.

It is sufficient for the electrode terminal connection region exposed through the cutout part or the electrode terminal connection region located at a position corresponding to the notch part to have a size to cause an intended electrical cut-off when the battery cells or the battery modules swell. Consequently, the electrode terminal connection region may be wholly exposed. Alternatively, only a portion of the electrode terminal connection region may be exposed.

In this specification, the structure of the notch is not particularly restricted so long as the notch is easily broken when the battery cells or the battery modules swell. For example, the notch may be configured in a structure formed by partially cutting a portion of the region of the case or the sealing member corresponding to the electrode terminal connection region in the shape of a slit or in a thin and long groove structure having a relatively small thickness.

As a concrete example of the structure, each of the unit modules includes battery cells, having electrode terminals connected in series to each other, constructed in a stacked structure in which a connection part between the electrode terminals is bent, and a pair of high-strength cell covers coupled to each other for covering the outer surfaces of the battery cells except the electrode terminals, and a cutout part or a notch part configured in a shape to induce local deformation of the battery cells, when the battery cells swell, is formed at a predetermined region of at least one of the cell covers adjacent to the electrode terminal connection region.

For example, battery cells may be covered by high-strength cell covers, made of synthetic resin or metal, to constitute a unit module. The high-strength cell covers serve to protect the battery cells, which exhibit low strength and, at the same time, to restrain the change in repetitive expansion and contraction of the battery cells during the charge and discharge of the battery cells, thereby preventing the breakage of sealing regions of the respective battery cells. A desired-shaped cutout part or a notch part is formed at a portion of at least one of the cell covers adjacent to the electrode terminal connection region such that an expansion stress caused by the swelling of the battery cells is concentrated on the electrode terminal connection region corresponding to the cutout part or the notch part of the cell cover.

For example, the battery module may include a plurality of unit modules of which each includes plate-shaped battery cells each having electrode terminals formed at the front and rear sides of a battery case. In this structure, the unit modules may be mounted in the case in a structure in which the unit modules are erected in the lateral direction while being spaced a predetermined distance from each other such that a coolant can flow through the space to cool the unit modules. In this structure, the cutout part or the notch part may be formed at a cell cover of the outermost unit module. Consequently, the expansion stress of the battery cells due to the abnormal operation of the battery cells is concentrated on the cutout part or the notch part formed at the cell cover of the outermost unit module, with the result that the electrode terminal connection region between the battery cells of the outermost unit module is broken, whereby the electrical connection for charging and discharging is interrupted.

The size of the cutout part or the notch part may be changed depending upon the breakage setting conditions of the electrode terminal connection region. Preferably, the size of the cutout part or the notch part is set such that the electrode terminal connection region is broken when the swelling of the battery cells brings about the increases in volume of the battery cells equivalent to 1.5 to 5 times the thickness of each battery cell. The setting range may be changed based on the safety test standard of a desired battery module. However, when the size of the of the cutout part or the notch part is too large, the mechanical strength of the battery cells achieved by the cell covers may decrease, and the expansion of the battery cells may not be properly restrained in a normal operation condition. Therefore, it is necessary to set the size of the cutout part or the notch part within an appropriate range in consideration of the above-mentioned respects.

In accordance with another aspect of the present invention, there is provided a middle- or large-sized battery pack including the battery module as described above.

Specifically, the middle- or large-sized battery pack according to the present invention includes a battery module, a battery management system (BMS) for detecting and controlling the operation of the battery module, and a power switch unit located between the battery module and an external input and output circuit for connecting the battery module and the external input and output circuit to each other or disconnecting the battery module and the external input and output circuit from each other according to an operation command from the BMS. The connection between the battery module and the power switch unit is interrupted independently from the BMS in an abnormal operation condition.

In the conventional middle- or large-sized battery pack, as previously described with reference to FIG. 1, the connection between the battery module and the external input and output circuit is interrupted by the power switch unit under the control of the BMS, when overcurrent or overvoltage occurs in the battery module, and therefore, the occurrence of the safety-related problems due to the overcurrent or the overvoltage is prevented.

However, when the BMS abnormally operates or does not operate, it is not possible for the BMS to control the power switch unit, with the result that the battery module under the abnormal condition is connected to the external input and output circuit, which leads to a serious situation.

On the other hand, the middle- or large-sized battery pack according to the present invention is constructed in a structure in which the connection between the battery module and the power switch unit is interrupted independently from the BMS in an abnormal operation condition. Consequently, when an abnormal operation, such as overcharge, overdischarge, or overcurrent, of the battery module occurs, the electrode terminal connection region is broken and short-circuited due to the expansion stress of the battery cells due to the swelling of the battery cells, as previously described, and therefore, the supply of power to the battery module is interrupted. As a result, the electrical conduction between the battery module and the external input and output circuit is prevented even when the BMS abnormally operates or does not operate.

For reference, the external input and output circuit may be connected to an external device, such as a motor or an electronic device of a vehicle. For example, the external input and output circuit may be an inverter that converts direct current electricity into alternating current electricity. Also, the power switch unit may be a relay.

In an exemplary embodiment, the middle- or large-sized battery pack is constructed in a structure in which a plurality of battery modules are fixed by a frame member, outermost battery modules are covered by sealing members fixed to the frame member, and cutout parts or notch parts configured in a shape to induce local deformation of the battery modules when the battery modules swell are formed at predetermined regions of the sealing members adjacent to an electrode terminal connection region.

That is, the predetermined-shaped cutout parts or the predetermined-shaped notch parts are formed at predetermined regions of the sealing members adjacent to an electrode terminal connection region such that an expansion stress caused by the swelling of the battery modules is concentrated on the cutout parts or the notch parts of the sealing members.

Consequently, the electrode terminal connection region between the battery cells or the unit modules of each outermost battery module extrudes outside through the corresponding cutout part or through the broken notch part. The swelling volume of the protruding electrode terminal connection region continuously increases, and, when the swelling volume reaches a predetermined critical breakage value, the electrode terminal connection region is broken, with the result that the connection between the electrode terminals is interrupted, thereby securing the safety of the battery pack.

In the above-described structure, the sealing members may be made of a heat insulating material to further increase the uniformity between the battery modules. In particular, the sealing members may be made of foam resin to minimize the total weight of the battery pack and, at the same time, to improve heat insulation.

As a concrete example of such a structure, the battery pack includes a battery module assembly including a plurality of rectangular battery modules, each of which includes a plurality of battery cells or unit modules connected in series to each other, stacked by twos or more in the lateral direction (the vertical direction) and the height direction (the horizontal direction) such that the battery cells or the unit modules are generally configured in a hexahedral structure (a hexahedral stack), outer edges of the hexahedral stack being fixed by the frame member, and a BMS mounted at an orientation surface of input and output terminals, a surface opposite to the orientation surface, or a surface at a side of the orientation surface, for controlling the operation of the battery modules. The battery cells of the unit modules in each of the rectangular battery modules are arranged in parallel to a pair of opposite surfaces (a, d) of the hexahedral stack, and a sealing member having the cutout part or the notch part is mounted at at least one of the opposite surfaces (a, d) of the hexahedral stack.

In the middle- or large-sized battery pack, the plurality of rectangular battery modules are stacked in the vertical direction and in the horizontal direction to constitute the hexahedral stack, and the hexahedral stack is fixed by the frame member. Consequently, the middle- or large-sized battery pack is generally constructed in a compact and stable structure. Also, the mechanical coupling and the electrical connection of the middle- or large-sized battery pack are achieved without using a large number of members.

Each of the rectangular battery modules, constituting the hexahedral stack, is constructed in a structure in which the plurality of battery cells or unit modules are connected in series to each other, as previously described. For example, two or more plate-shaped battery cells are stacked to constitute each rectangular battery module. Preferably, two or more unit modules are stacked to constitute each rectangular battery module.

Also, the BMS, which is a system for controlling the operation of the battery modules, is mounted at a surface where the input and output terminals are located (a terminal orientation surface), a surface opposite to the orientation surface, or a surface at a side of the orientation surface. Consequently, the connection between the BMS and the input and output terminals is easily achieved, the electrical connection structure and thus the assembling process thereof are further simplified, the increase of internal resistance is prevented through the reduction in length of an electrical connection member, and a possibility of the connection member short circuiting due to external impact decreases.

Since the battery cells of the unit modules in each of the rectangular battery modules are arranged in parallel to the pair of opposite surfaces (a, d) of the hexahedral stack to achieve high spatial utilization, the rectangular battery modules are also arranged in parallel to the pair of opposite surfaces (a, d) of the hexahedral stack, and the cutout parts or the notch parts are formed at the sealing members mounted at the opposite surfaces (a, d), whereby local deformation of the swelling battery modules is easily induced at the electrode terminal connection region.

In the above-described structure, the frame member for fixing the outer edges of the hexahedral stack, constituted by the rectangular battery modules, may be configured in various structures. For example, the frame member may be configured in a structure in which a plurality of frame pieces integrally coupled to each other such that each frame piece fixes corresponding one of 12 edges of the hexahedral stack or in a structure in which a plurality of frames integrally coupled to each other such that each frame fixes at least four edges of the hexahedral stack on the same plane.

Specifically, the frames fixing the four edges located at opposite sides of the hexahedral stack in the lateral direction are constructed in an integrated structure, and the remaining individual frame pieces are coupled to the integrated frames. In this coupling structure, for example, the upper-row rectangular battery modules are fixed by two individual frame pieces, the lower-row rectangular battery modules are fixed by the remaining two individual frame pieces, and the two integrated frames are coupled to the four individual frame pieces. In this way, the fabrication of the battery module assembly is easily achieved, thereby improving the fabrication efficiency.

The middle- or large-sized battery pack according to the present invention may be used as a power source for electric vehicles, hybrid electric vehicles, etc., which have a limited installation space and are exposed to frequent vibration and strong impact, in consideration of the installation efficiency and structural stability of the battery pack.

In accordance with another aspect of the present invention, there is provided a method of securing the safety of a high-power, large-capacity battery module or a battery pack, the battery module including a plurality of battery cells or unit modules connected in series to each other such that the battery cells or the unit modules are stacked while being in tight contact with each other or being adjacent to each other, the battery pack including a plurality of the battery modules connected in series or in parallel to each other, the method including concentrating an expansion stress on an electrode terminal connection region between the battery cells or the unit modules, when the battery cells excessively swell, whereby the electrode terminal connection region is broken, and therefore, an electrical cut-off occurs at the electrode terminal connection region.

By using this method, it is possible to break the electrical connection structure in the battery module and thus prevent the combustion or explosion of the battery pack when the battery module abnormally operates or the battery module is deviated from its appropriate operation state as a result of excessive use of the battery module, as previously described, although the BMS, which is the charging and discharging control system, does not operate or abnormally operates.

In accordance with a further aspect of the present invention, there is provided a battery pack including high-power, large-capacity battery modules connected in series or in parallel to each other, each of the battery modules including a plurality of battery cells or unit modules connected in series to each other such that the battery cells or the unit modules are stacked while being in tight contact with each other or being adjacent to each other, wherein the battery pack is constructed in a structure in which pressure, generated in the battery cells when the battery cells are overcharged, is concentrated on weak parts of the battery cells or the unit modules, such that the weak parts are broken, and therefore, an electrical cut-off occurs at the weak parts, whereby the safety of the battery pack is secured.

Since the battery pack includes the weak parts configured in a specific structure, the internal pressure of the battery cells is induced at the weak parts, when the battery cells are overcharged, with the result that an electrical cut-off occurs at the weak parts, whereby the safety of the battery pack is greatly improved.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, exemplary embodiments of the present invention will be described in detail with reference to the accompanying drawings. It should be noted, however, that the scope of the present invention is not limited by the illustrated embodiments.

Figure 1:
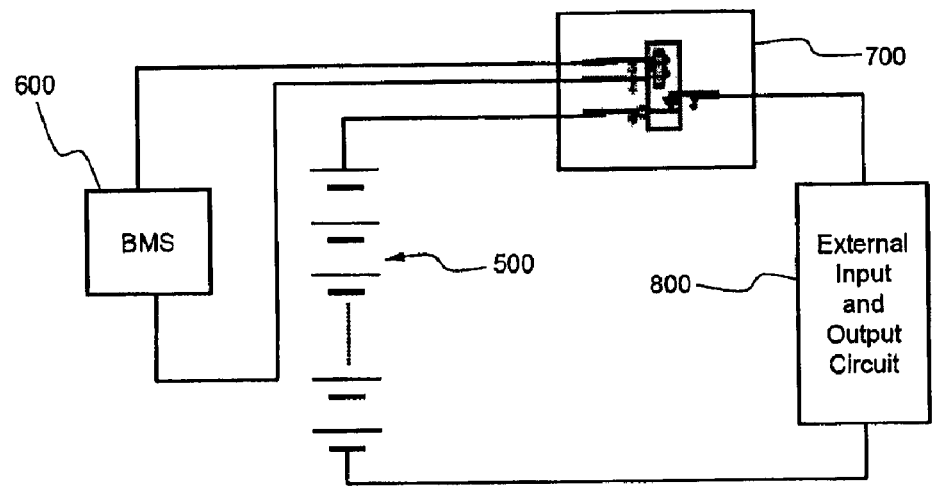
FIG. 1 is a circuit diagram typically illustrating a conventional middle- or large-sized battery pack.
Figure 2:
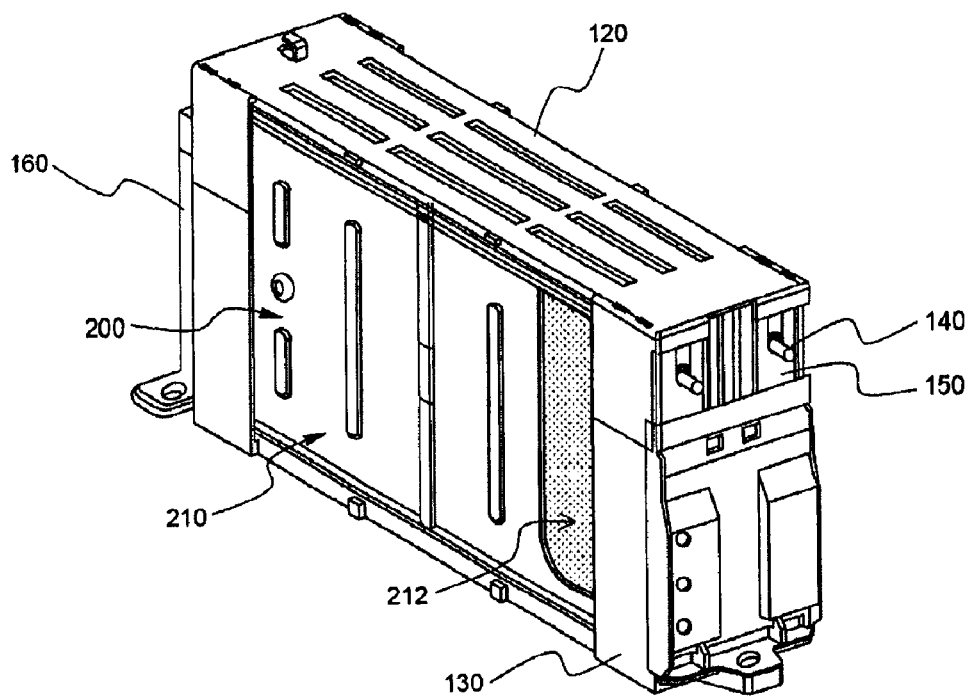
FIG. 2 is a perspective view illustrating a battery module according to an exemplary embodiment of the present invention.

FIG. 2 is a perspective view typically illustrating a battery module according to an exemplary embodiment of the present invention.

Referring to FIG. 2, the battery module 100' is constructed in a structure in which a unit module stack 200 is mounted between an upper case 120 and a lower case 130, which are assembled to each other vertically, while the unit module stack 200 is erected on the side thereof. At the front of the upper case 120 is formed an input and output terminal 140. At the front of the lower case 130 is formed a bus bar 150 electrically connected to the input and output terminal 140. At the rear of the lower case 130 is mounted a connector 160 to which a voltage and temperature sensor is connected.

In the unit module stack 200, a cutout part 212 is formed in a cell cover of the outermost unit module 210. Consequently, when a battery cell is swelled by gas generated in the battery cell due to a short circuit or overcharge of the battery cell, the local deformation of a battery cell is induced at the cutout part 212.

Figure 3:
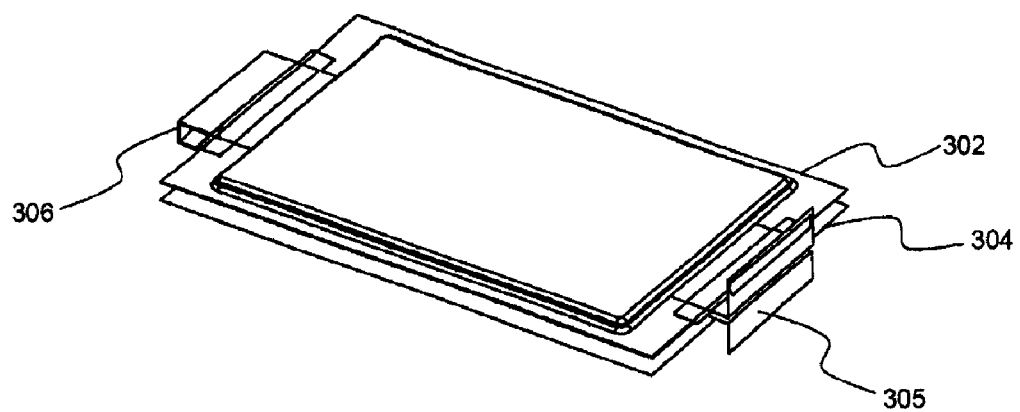
FIGS. 3 and 4 are perspective views illustrating a pair of battery cells and cell covers constituting a unit module.
Figure 4:
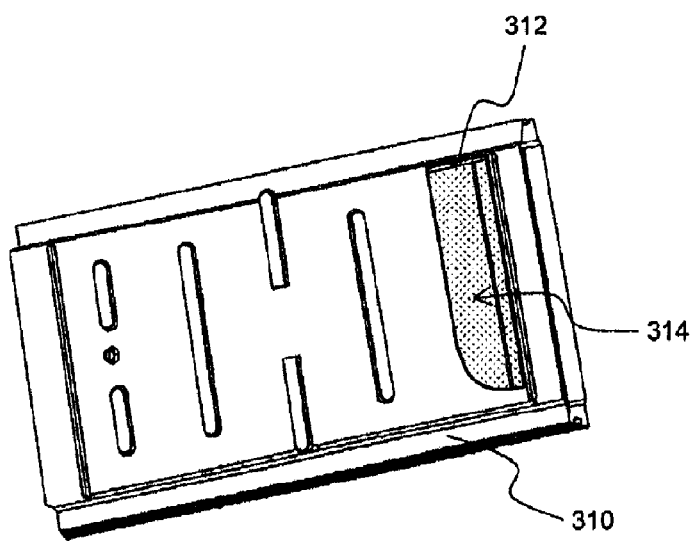

FIGS. 3 and 4 are perspective views typically illustrating a pair of battery cells and cell covers constituting a unit module.

The unit module (not shown) is constructed in a structure in which two battery cells 302 and 304 are connected in series to each other, and the battery cells 302 and 304 are covered by high-strength cell covers 310 while electrode terminals 305 and 306 are bent. The cell covers 310 are coupled to each other to cover the outer surfaces of the battery cells 302 and 304 excluding the electrode terminals 305 and 306. In a region of one of the cell covers 310 adjacent to electrode terminal connection region 314 of the battery cells 302 and 304 is formed a cutout part 312, which is obtained by cutting out a portion of the corresponding cell cover 310. Consequently, when the battery cells 302 and 304 swell, the electrode terminal connection region 314 protrudes out of the cutout part 312 and is deformed.

Figure 5:
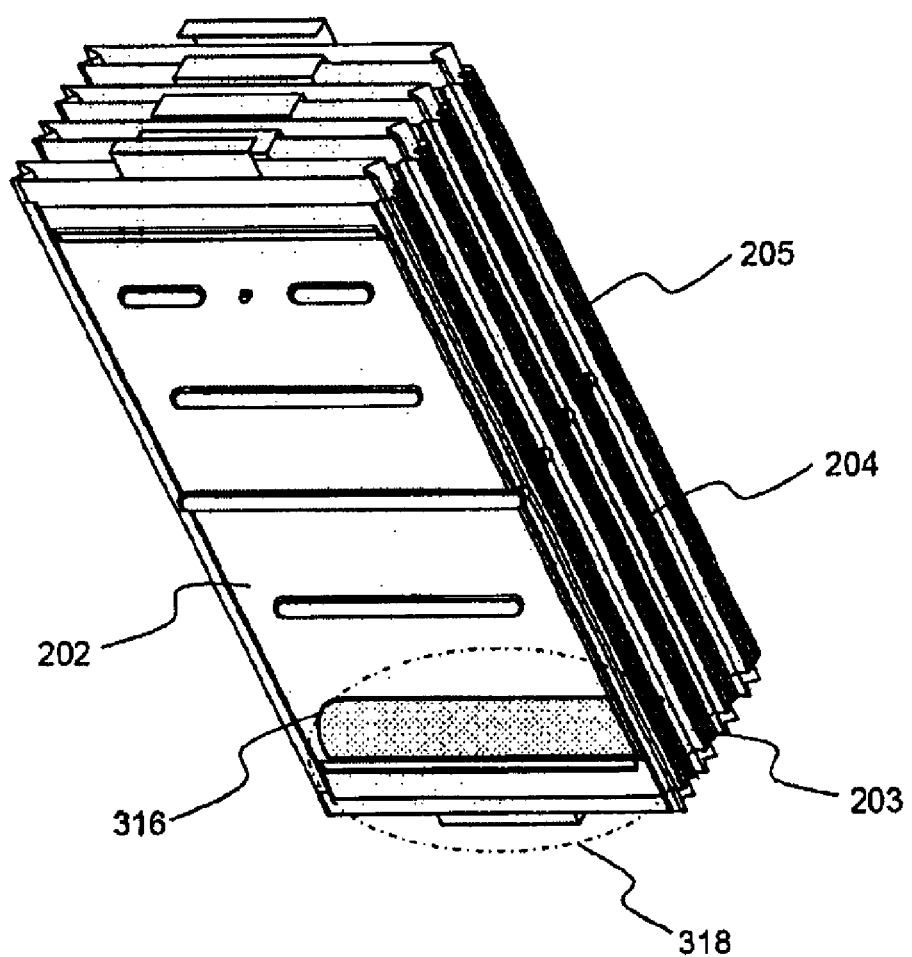
FIG. 5 is a perspective view illustrating a unit module stack.

FIG. 5 is a perspective view typically illustrating a unit module stack.

Referring to FIG. 5, the unit module stack 200 is constructed in a structure in which four unit modules 202, 203, 204, and 205, each of which is manufactured in a structure in which battery cells are covered by corresponding cell covers, are stacked in a zigzag fashion while the unit modules 202, 203, 204, and 205 are connected in series to each other. In one of the cell covers covering the outermost unit module 202, among the unit modules 202, 203, 204, and 205, is formed a predetermined shaped cutout part 316, which is located at a region 318 adjacent to an electrode terminal connection region.

Figure 6:
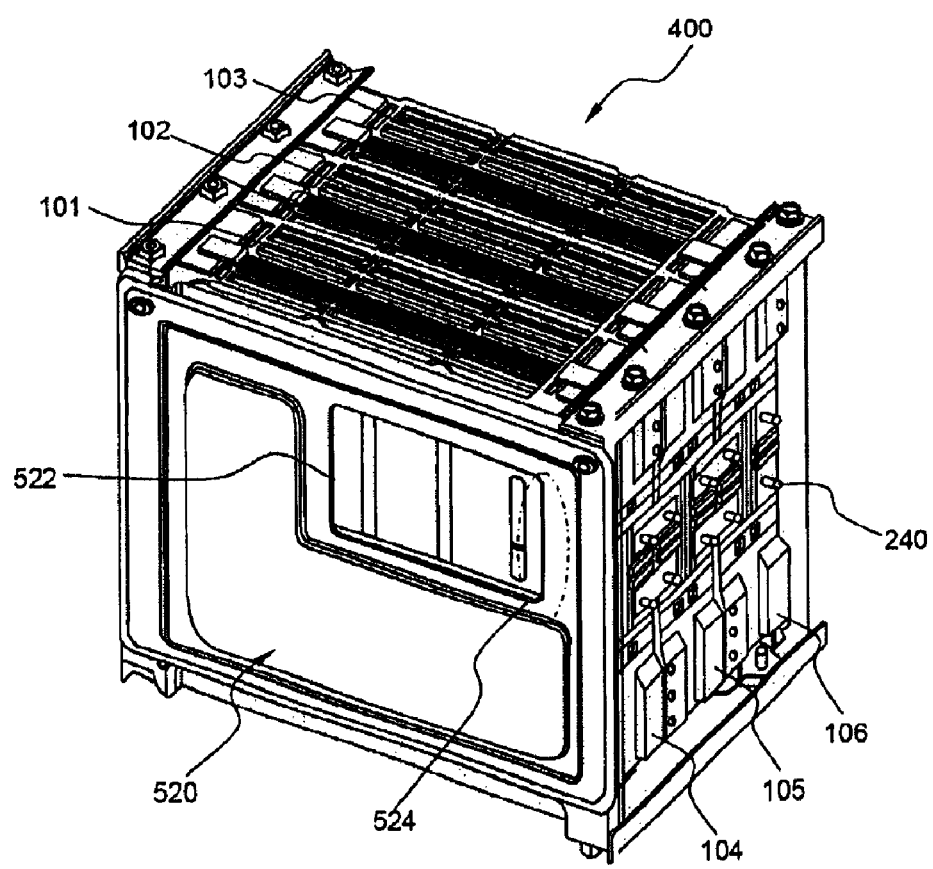
FIG. 6 is a perspective view illustrating a battery module assembly according to another exemplary embodiment of the present invention.
Figure 7:
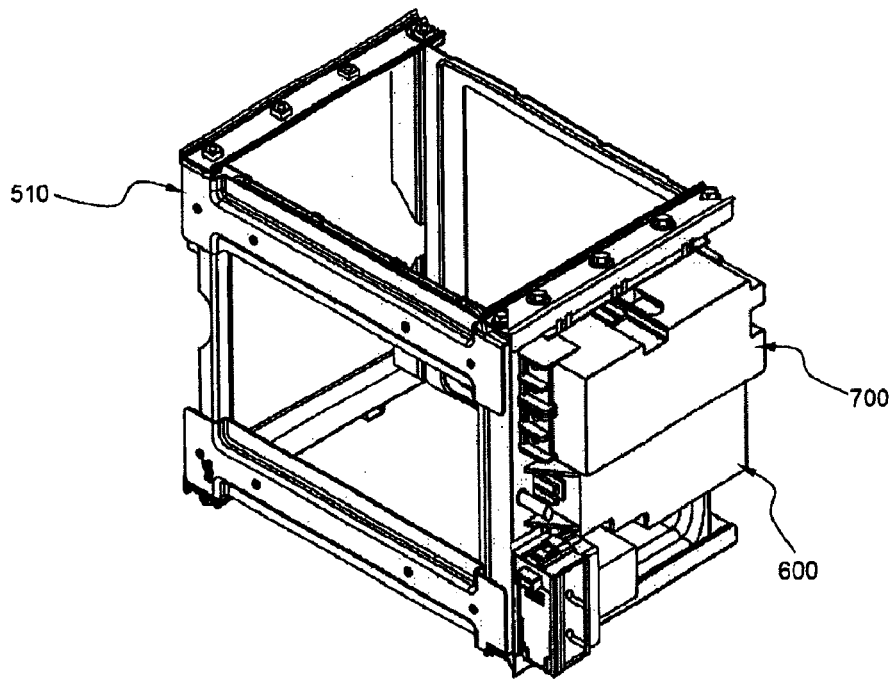
FIG. 7 is a perspective view illustrating the middle- or large-sized battery pack from which a battery module assembly is removed.

FIG. 6 is a perspective view typically illustrating a battery module assembly according to another exemplary embodiment of the present invention, and FIG. 7 is a perspective view typically illustrating the middle- or large-sized battery pack from which a battery module assembly is removed.

Referring to these drawings, the middle- or large-sized battery pack is constructed in a structure in which a power switch unit 600 and a battery management system (BMS) 700 are mounted at one side of a battery module assembly 500' including a hexahedral stack 400 constituted by six rectangular battery modules 101, 102, 103, 104, 105, and 106 and a frame member 510 for fixing outer edges of the hexahedral stack 400. The middle- or large-sized battery pack is generally formed in the shape of a rectangular parallelepiped.

The six rectangular battery modules 101, 102, 103, 104, 105, and 106 are stacked in a manner in which every two battery modules are stacked in the horizontal direction and every three battery modules are stacked in the vertical direction. Also, the rectangular battery modules 101, 102, 103, 104, 105, and 106 are stacked in an opposite arrangement structure such that input and output terminals 240 formed at one-side surfaces of the battery modules are adjacent to each other. That is, the upper-row battery modules 101, 102, and 103 are stacked on the corresponding lower-row battery modules 104, 105, and 106 in a state in which the upper-row battery modules 101, 102, and 103 turn upside down such that the upper-row battery modules 101, 102, and 103 and the corresponding lower-row battery modules 104, 105, and 106 are symmetrical to each other along an imaginary center line.

The frame member 510 is constructed in a structure in which a plurality of frames are coupled to one another to stably fix twelve outer edges of the hexahedral stack 400. In a state in which the hexahedral stack 400 is mounted in the frame member 510, six surfaces of the hexahedral stack 400 are exposed to the outside.

The power switch unit 600 and the BMS 700, which serve to conduct electric current, if necessary, for performing a charging and discharging operation, serve to appropriately drop voltage at the time of commencing the operation of the battery system or during decomposition of the battery system, serve to electrically interconnect the rectangular battery modules 101, 102, 103, 104, 105, and 106, and serve to protect a circuit from overcurrent, overvoltage, etc., are mounted at the front of the hexahedral stack 400 where the input and output terminals 240 are located. The input and output terminals 240 of the rectangular battery modules 101, 102, 103, 104, 105, and 106 are adjacent to one another. Consequently, it is possible to easily achieve the connection between the input and output terminals 240 and the power switch unit 600 and to greatly reduce the length of a member for electrical connection.

A sealing member 520 having a cutout part 522 formed therein is mounted in the opening of the frame at one side of the front of the hexahedral stack 400 where the power switch unit 600 is mounted. Consequently, the swelling of the outermost battery module 101 is induced at the opening of the cutout part 522, and an electrode terminal connection region 524 in the outermost battery module 101 adjacent to the cutout part 522 is broken or short-circuited by the swelling of the outermost battery module 101, thereby securing the safety of the middle- or large-sized battery pack.

Figure 8:
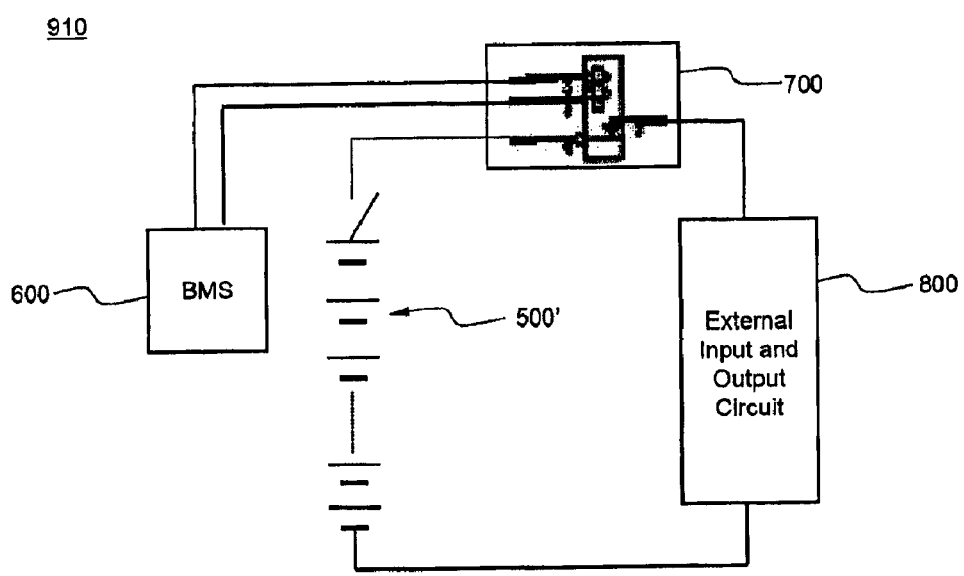
FIG. 8 is a circuit diagram typically illustrating a middle- or large-sized battery pack according to another exemplary embodiment of the present invention.

FIG. 8 is a circuit diagram typically illustrating a middle- or large-sized battery pack according to another exemplary embodiment of the present invention.

Referring to FIG. 8, the middle- or large-sized battery pack 910 includes a battery module assembly 500', a BMS 600 for detecting and controlling the operation of the battery module assembly 500', an external input and output circuit 800 connected to an external device, and a power switch unit 700 located between the battery module assembly 500' and the external input and output circuit 800 for connecting the battery module assembly 500' and the external input and output circuit 800 to each other or disconnecting the battery module assembly 500' and the external input and output circuit 800 from each other according to the operation command from the BMS 600.

The middle- or large-sized battery pack 910 includes an outermost cell cover having the cutout part 212 of FIG. 2 formed therein or a sealing member 520 having the cutout part 522 of FIG. 6 formed therein. Consequently, when the swelling thickness of the battery cell becomes twice or more the original thickness of the battery cell, the electrode terminal connection region protrudes into the cutout part 212 or 522, and therefore, the battery cell is short-circuited. As a result, the electrical connection between the battery module assembly 500' and the power switch unit 700 is interrupted, thereby preventing the electrical conduction between the battery module assembly 500' and the external input and output circuit 800.

The inventors of the present invention manufactured a middle- or large-sized battery pack based on the structure of FIG. 6, and carried out overcharge experiments with respect to the manufactured middle- or large-sized battery pack to actually confirm the effects acquired by constructing the middle- or large-sized battery pack according to the present invention. The experiment result is shown in FIG. 9.

Figure 9:
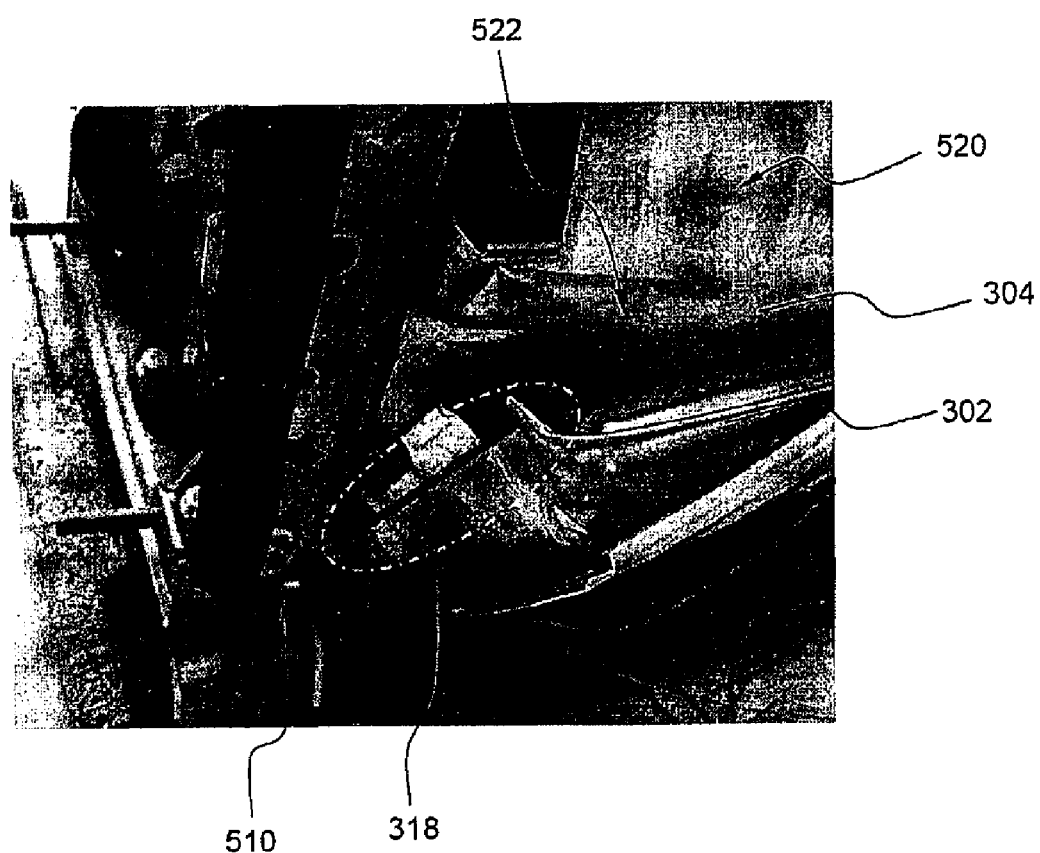
FIG. 9 is an experimental picture of a middle- or large-sized battery pack illustrating that an electrode terminal is broken by swelling.

Referring to FIG. 9, the swelling of the battery cells 302 and 304 was observed when the middle- or large-sized battery pack was overcharged. The swelling was concentrated on the cutout part 522 of the sealing member 520, whereas the swelling was considerably restrained at the sealing member 520 fixed to the frame member 510. As a result, the swelling of the battery cells 302 and 304 at the cutout part 522 reached approximately three times the normal thickness of the respective battery cells. By such swelling of the battery cells 302 and 304, the electrode terminal connection region 318 of the battery cells 302 and 304 was broken, with the result that the connection in series between the battery cells 302 and 304 was interrupted, and therefore, an electrical cut-off occurred. Consequently, the charging operation was no longer carried out.

Figure 10:
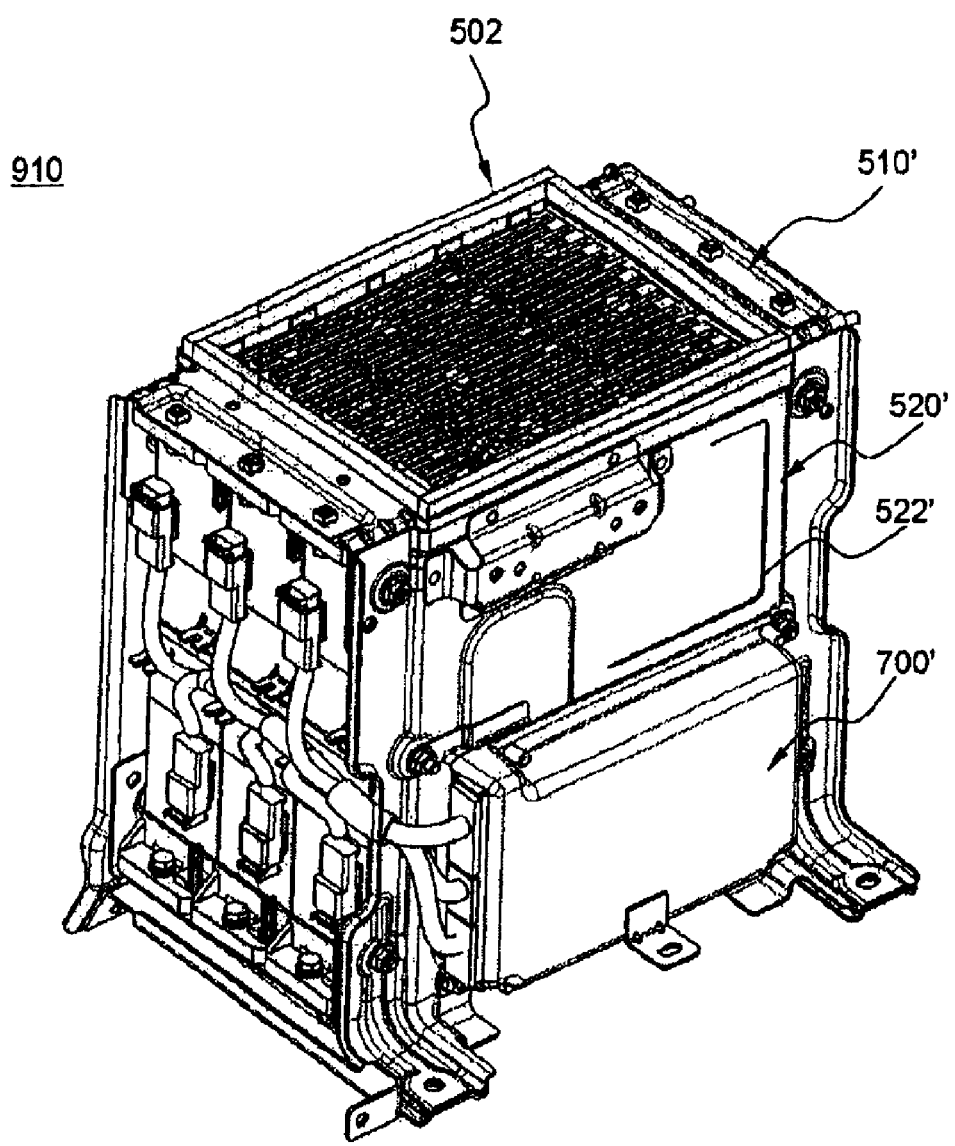
FIG. 10 is a perspective view illustrating a middle- or large-sized battery pack according to a further exemplary embodiment of the present invention.
Figure 11:
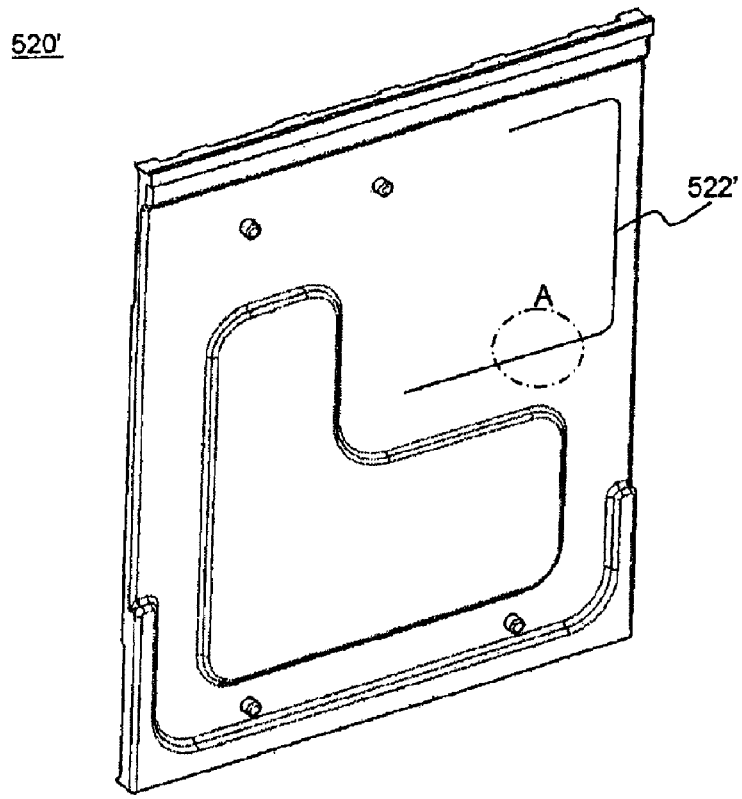
FIG. 11 is a perspective view illustrating a sealing member of FIG. 10.

FIG. 10 is a perspective view typically illustrating a middle- or large-sized battery pack according to a further exemplary embodiment of the present invention, and FIG. 11 is a perspective view typically illustrating a sealing member of FIG. 10.

Referring to these drawings, the middle- or large-sized battery pack 910 includes a battery module assembly 502 having six rectangular battery modules stacked in a two-story structure while being arranged three by three in the lateral direction (the vertical direction) such that the six rectangular battery modules are generally configured in a hexahedral structure (a hexahedral stack), outer edges of the hexahedral stack being fixed by a frame member 510', and a BMS 700' mounted at one side of the frame member 510' corresponding to input and output terminals for controlling the operation of the battery modules.

Also, a sealing member 520' having a notch 522' formed approximately in the shape of '[' is mounted at the frame member 510' where the BMS 700' is located. Consequently, when the battery cells excessively swell, the notch 522' of the sealing member 520' is broken, and therefore, the battery cells of the outermost battery module protrude outward. As a result, an electrical cut-off occurs at an electrode terminal connection region between the battery cells.

Figure 12:
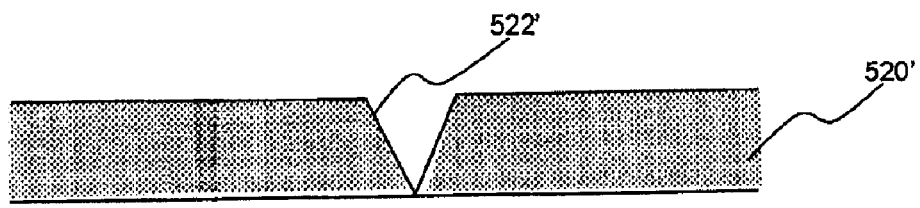
FIG. 12 is a vertical sectional view illustrating region A of FIG. 11.
Figure 12:
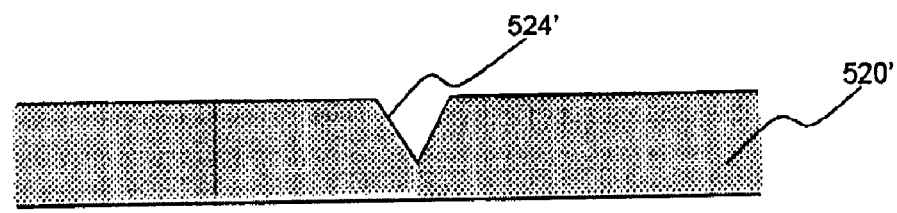

FIG. 12 is a vertical sectional view typically illustrating region A of FIG. 11.

Referring to FIG. 12, the notch may be configured in a structure 522' formed by partially cutting a portion of the sealing member 520' in the shape of a slit or in a thin and long groove structure 524' having a relatively small thickness.

INDUSTRIAL APPLICABILITY

As apparent from the above description, the battery module according to the present invention is constructed in a structure in which a portion of the electrode terminal connection region between the battery cells is weak with respect to the volume expansion of the battery cells due to the swelling of the battery cells. As a result, when the battery cells swell due to an abnormal operation, such as overcharge, overdischarge, or overcurrent, of the battery module or due to the deterioration of the battery cells caused by the charge and discharge of the battery cells for a long time, the electrode terminal connection region is broken and short-circuited. Consequently, the present invention has the effect of greatly improving the safety of the battery module.

Also, the middle- or large-sized battery pack according to the present invention is constructed in a structure in which the electrical connection between the battery module and the power switch unit is interrupted independently from the BMS. Consequently, the present invention has the effect of securing the safety of the battery pack, even when the BMS abnormally operates or does not operate, and, in addition, greatly improving the reliability of the battery pack.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A high-power, large-capacity battery pack comprising:
   (i) a plurality of battery modules in which each of the battery modules includes a plurality of battery cells or unit modules connected in series to each other such that the battery cells or the unit modules are stacked while being in tight contact with each other or being adjacent to each other,
   wherein each of the battery modules is fixed such that the stacked state of the battery cells or the unit modules is maintained even when a volume of the battery cells or the unit modules changes at the time of charging and discharging the battery cells or the unit modules, and
   wherein a portion of an electrode terminal connection region between the battery cells or between the unit modules is weak with respect to a volume expansion of the battery cells or the unit modules such that an expansion stress caused by swelling of the battery cells is concentrated on the electrode terminal connection region, whereby the electrode terminal connection region is broken, and therefore, an electrical cut-off occurs at the electrode terminal connection region, when the swelling exceeds a predetermined value;
(ii) a battery management system (BMS) for detecting and controlling operation of at least one battery module; and
(iii) a power switch unit located between the at least one battery module and an external input and output circuit for connecting the at least one battery module and the external input and output circuit to each other or disconnecting the at least one battery module and the external input and output circuit from each other according to an operation command from the BMS,
wherein the battery modules are fixed by a frame member, and outermost battery modules are covered by sealing members fixed to the frame member,
wherein cutout parts or notch parts configured in a shape to induce local deformation of the battery modules, when the battery modules swell, are formed at predetermined regions of the sealing members adjacent to an electrode terminal connection region, and
wherein a connection between the at least one battery module and the power switch unit is interrupted independently from the BMS in an abnormal operation condition.

2. The battery pack according to claim 1, wherein the battery cells or the unit modules are covered by a case, and a partial opening or a notch is formed at a predetermined region of the case corresponding to the electrode terminal connection region, which is broken when the swelling of the battery cells is excessive.

3. The battery pack according to claim 2, wherein each of the unit modules includes battery cells, having electrode terminals connected in series to each other, constructed in a stacked structure in which a connection part between the electrode terminals is bent, and a pair of high-strength cell covers coupled to each other for covering the outer surfaces of the battery cells except the electrode terminals, and
a cutout part or a notch part, which is configured in a shape to induce local deformation of the battery cells when the battery cells swell, is formed at a predetermined region of at least one of the cell covers adjacent to the electrode terminal connection region.

4. The battery pack according to claim 3, wherein the cutout part or the notch part is formed at a cell cover of the outermost unit module.

5. The battery pack according to claim 3, wherein a size of the cutout part or the notch part is set such that the electrode terminal connection region is broken when the swelling of the battery cells brings about increases in the volume of the battery cells equivalent to 1.5 to 5 times a thickness of each battery cell.

6. The battery pack according to claim 1, wherein the sealing members are made of a heat insulating material.

7. The battery pack according to claim 1, wherein the battery pack comprises:
the battery modules being a plurality of rectangular battery modules, each of which includes a plurality of the battery cells or the unit modules connected in series to each other, stacked by twos or more in a lateral direction (a vertical direction) and a height direction (a horizontal direction) such that the battery cells or the unit modules are generally configured in a hexahedral structure (a hexahedral stack), outer edges of the hexahedral stack being fixed by the frame member; and
the BMS mounted at an orientation surface of input and output terminals, a surface opposite to the orientation surface, or a surface at a side of the orientation surface, for controlling the operation of the battery modules, and
wherein the battery cells or the unit modules in each of the rectangular battery modules are arranged in parallel to a pair of opposite surfaces of the hexahedral stack, and sealing members having cutout parts or notch parts are mounted at the opposite surfaces of the hexahedral stack.

8. The battery pack according to claim 7, wherein the frame member includes a plurality of frames integrally coupled to each other such that each frame fixes corresponding one of 12 edges of the hexahedral stack or each frame fixes at least four edges of the hexahedral stack on the same plane.

9. An electric vehicle or a hybrid electric vehicle including the battery pack according to claim 1 as a power source.

* * * * *